United States Patent [19]

Nagashima et al.

[11] Patent Number: 4,562,444

[45] Date of Patent: Dec. 31, 1985

[54] THERMAL TRANSFER ELECTROPRINTING APPARATUS

[75] Inventors: Masayoshi Nagashima, Chigasaki; Hiroshi Yamane, Ebina, both of Japan

[73] Assignee: Tokyo Shibaura Denki Kabushiki Kaisha, Kawasaki, Japan

[21] Appl. No.: 467,161

[22] Filed: Feb. 16, 1983

[30] Foreign Application Priority Data

Feb. 17, 1982 [JP] Japan .................................. 57-24111

[51] Int. Cl.[4] .......................... G01D 15/10; B41J 3/20; H04N 1/21; G03G 15/00

[52] U.S. Cl. ............................... 346/76 PH; 346/145; 400/120; 400/578; 358/296; 355/14 SH

[58] Field of Search .......................... 346/76 PH, 145; 358/296; 400/120; 355/14 SH

[56] References Cited

U.S. PATENT DOCUMENTS 4,404,568 9/1983 Kihuchi et al. ................ 346/76 PH
4,449,152 5/1984 Kurata et al. ........................ 358/296

*Primary Examiner*—E. A. Goldberg
*Assistant Examiner*—Gerald E. Preston
*Attorney, Agent, or Firm*—Cushman, Darby & Cushman

[57] ABSTRACT

An electroprinting apparatus is constructed of upper and lower units elevationally openable at the boundary of an ink ribbon travelling path. The upper unit is provided with an ink ribbon feeding reel and an ink ribbon winding reel. An ink ribbon is extended between the reels along the ink ribbon travelling path between the reels. A thermal head unit is mounted at the upper unit opposing the ink ribbon. The lower unit is provided with a paper feeding unit for conveying a paper sheet along the ink ribbon travelling path and a head roller for pressing the paper sheet together with the ink ribbon against the thermal head.

16 Claims, 5 Drawing Figures

THERMAL TRANSFER ELECTROPRINTING APPARATUS

BACKGROUND OF THE INVENTION

The present invention relates to a thermal transfer type electroprinting apparatus which produces copies from original documents by a thermal transfer process using an ink ribbon and a thermal head.

Most of the conventional electroprinting apparatuses have employed a toner. However, a thermal transfer type electroprinting apparatus which employs a thermal head and an ink ribbon has recently been developed. This thermal transfer type electroprinting apparatus is constructed so that a paper sheet is closely contacted by an ink ribbon, with a thermal head having a number of heating elements arranged in a row, beneath that ribbon. The thermal head is driven according to document information and selectively transfers the ink layer of the ink ribbon onto the paper sheet by selectively heating the heating elements according to the document information. According to such a conventional thermal transfer type electroprinting apparatus, a variety of advantages can be provided such that a compact structure and maintenance-free operation can be attained, and reliability improved. In addition, warming-up time can be eliminated, electric power consumption can be substantially reduced as compared with the conventional type, and external information can be applied to the document information, so that this apparatus has been improved for practical use. However, in the conventional apparatus the space inside the apparatus is small due to its small size, and the apparatus has a drawback that when the old ink ribbon is worn, it is difficult to replace it for a new one.

SUMMARY OF THE INVENTION

It is an object of the present invention to provide a thermal transfer type electroprinting apparatus which allows readily exchanging an ink medium.

According to an aspect of the present invention, there is provided a thermal transfer type electroprinting apparatus which is composed of two units capable of being opened at the boundary of the conveying surface of an ink medium.

DETAILED DESCRIPTION OF THE PREFERRED EMBODIMENT

Figure 1:
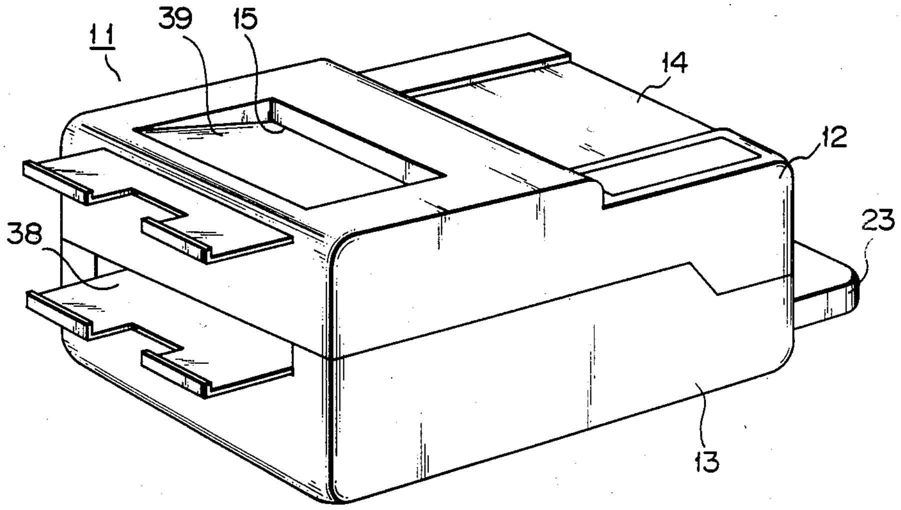
FIG. 1 is a perspective view of a thermal transfer type electroprinting apparatus according to an embodiment of the present invention.
Figure 2:
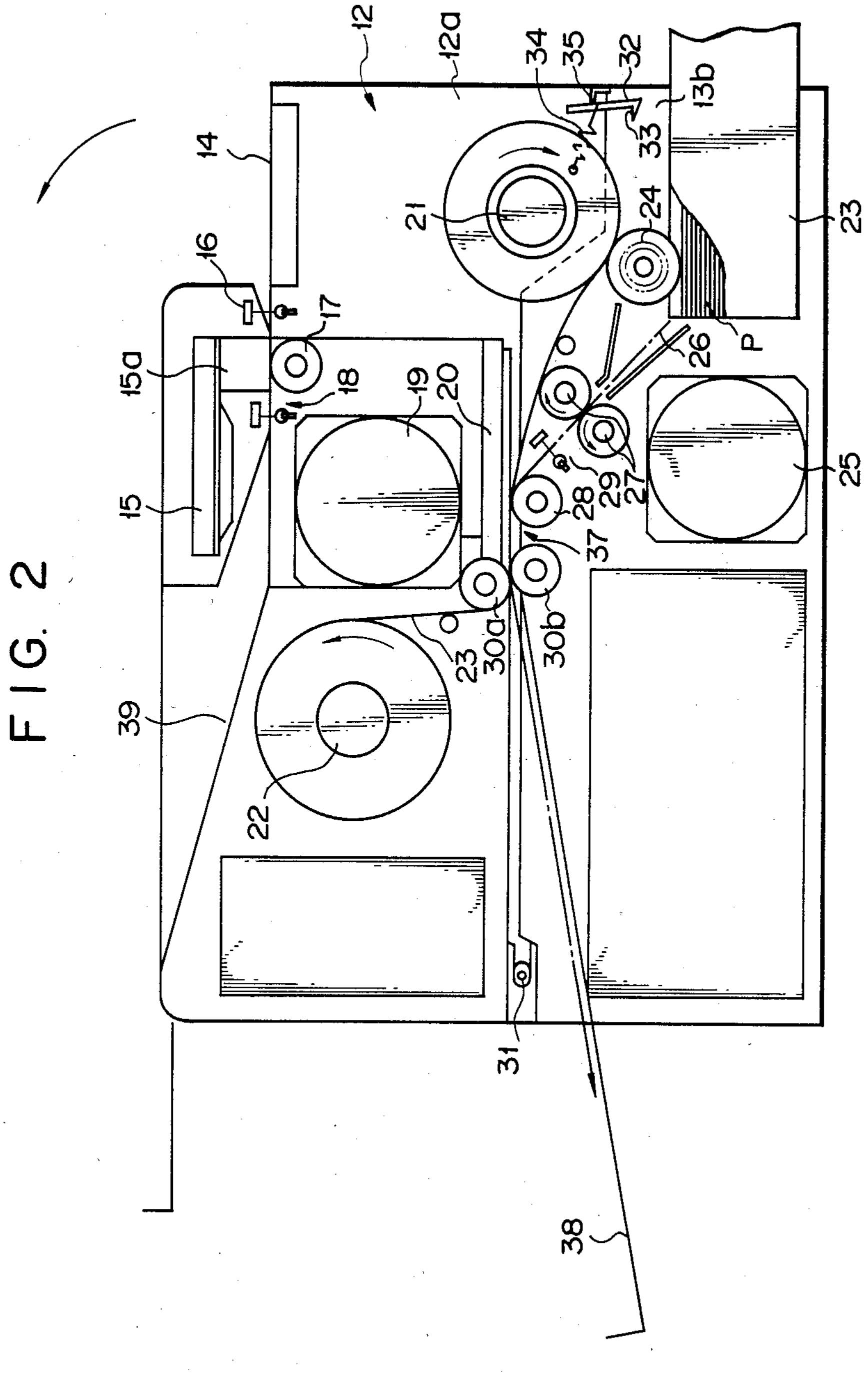
FIG. 2 is a view showing the internal structure of the electroprinting apparatus in FIG. 1.

A first embodiment of a thermal transfer type electroprinting apparatus according to the present invention will be described with detailed reference to FIGS. 1 and 2. The electroprinting apparatus 11 has an upper unit 12 and a lower unit 13. On the upper surface of the unit 12 a document table 14 and a contact scanner 15 are arranged. A paper sensor 16 is arranged at the input section of the scanner 15 to detect a document inserted from the table 14. The document is intimately contacted with a head **15*a* by a roller 17 which biases against the head 15*a* of the scanner 15. The document subsequently is fed to an output section. At the output section a rear end detector 18 detects the rear end of the document. The roller 17 is driven by a motor 19 which is mounted in the unit 12. A thermal head unit 20 is provided in the unit 12, in the vicinity of a boundary between the units 12 and 13. An ink ribbon feeding reel 21 and an ink ribbon winding reel 22 are detachably provided on the unit 12. An ink ribbon 23 of the reel 21 disposed at the front side is wound on the reel 22 through the bottom most portion of the head unit 20**.

A paper cassette 23 which contains paper sheets P is mounted at the lower front portion of the unit 13. A paper feed roller 24 contacts the upper surface of the superposed paper sheets P of the cassette 23. When the roller 24 is rotated by a pulse motor 25, the sheet P is fed to a paper guide path 26. Conveyor rollers 27, 27 are arranged on the path 26. A press roller 28 is provided to oppose the thermal head of the unit 20. A paper detector 29 is arranged between the roller 28 and the roller 27. Sheet ejecting rollers **30*a* and 30*b* are arranged adjacent to the roller 28. The rollers 30*a* and 30*b* are respectively mounted on the units 12 and 13**.

Figure 3:
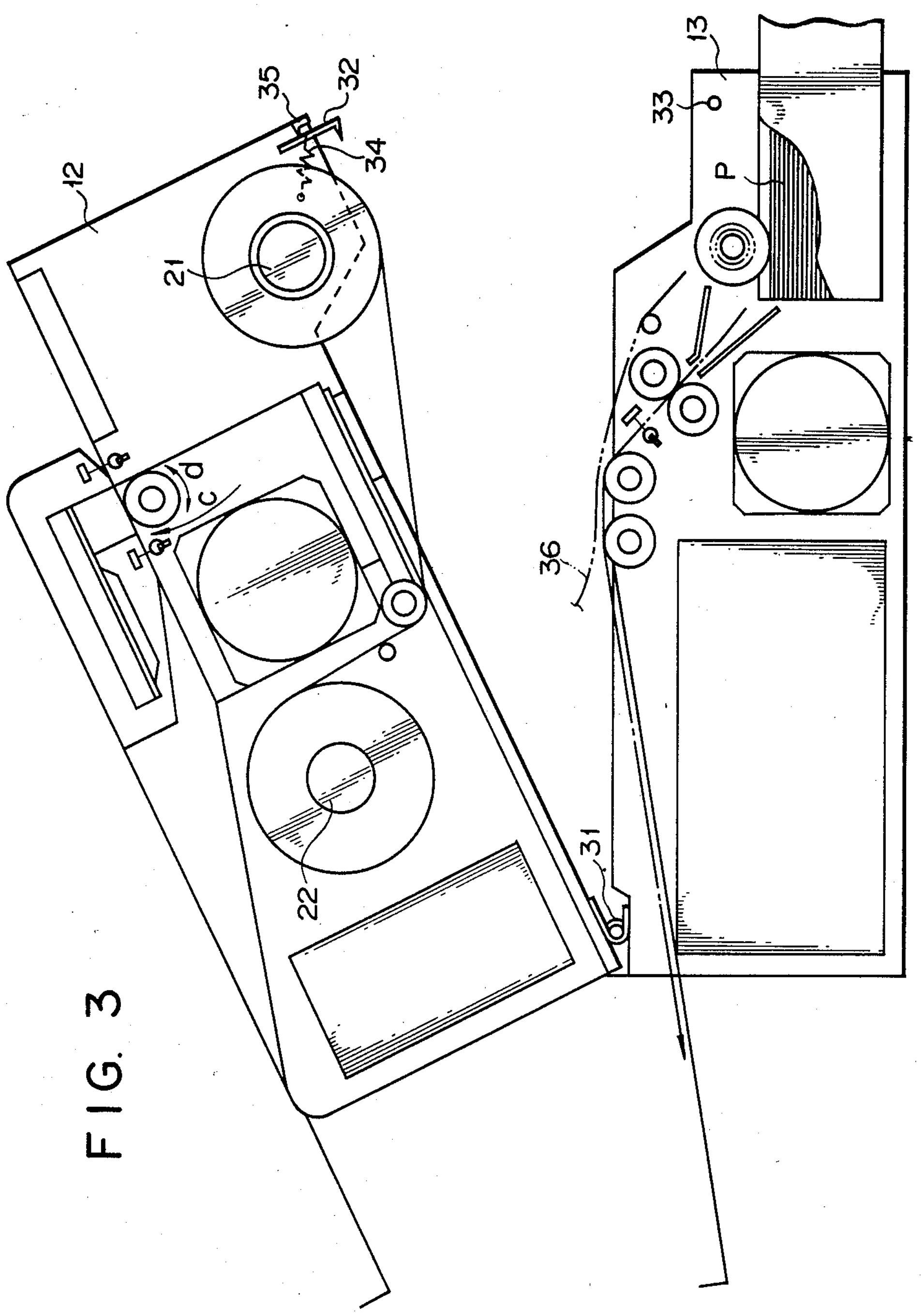
FIG. 3 is a view showing the construction of the apparatus in FIG. 1 when opened.

The units 12 and 13 are pivotally secured via a hinge 31 at the back side, and are locked via a hook 32 and a lock pin 33 at the front side. The hook 32 is pivotally secured to the frame **12*a* of the unit 12, and the pin 33 is fixed to the frame 13*a* of the unit 13. The hook 32 is urged toward a direction for engaging it with the lock pin 33 by a spring 34 coupled to the hook 32. A handle 35 is connected to the hook 32. When the handle 35 is pulled against the spring 34, the hook 32 is removed from the pin 33. When the hook 32 is removed from the pin 33, the unit 12 can be rotated upwardly around the hinge 31 as a rotating center, as shown in FIG. 3, and can be separated from the unit 13. In this state, the ink ribbon travelling path 36 of the ribbon 23 is sufficiently exposed so that it can be checked and maintained. Since the reels 22 and 21 are also sufficiently exposed from the lower side of the unit 12, the ribbon 23 can be readily exchanged. After this maintenance is finished, the unit 12 is pulled down on the unit 13 and the hook 32 is engaged with the pin 33 by gripping the handle 35, and the electroprinting apparatus 11** returns to the operable state.

When the apparatus 11 is operated, a power source (not shown) is first turned on. Then, an original document is placed on the table 14. When this document is inserted into the inlet section of the scanner 15, an end of the original document is detected by the detector 16. A copying operation is started in response to a detection signal from the detector 16. In other words, the document is conveyed into contact with the roller 17, and hence, the head **15*a* of the scanner 15. At this time, the scanner 15 scans the document and outputs an image signal corresponding to the document pattern. At this time, the roller 24 rotates and delivers the paper P through the path 26 to paper transportation rollers 27**.

The rollers 27 convey the sheet P to a printing section 37 which includes the thermal head unit 20. A detector 29 detects the sheet paper p, and after a predetermined period of time, (i.e., after the period of time it takes for the end of the sheet P to arrive at the roller 28 from the time detection by detector 29), the ribbon 23 is pressed against the sheet between the thermal head unit 20 and the roller 28. In this state, when the thermal head unit 20 is activated according to the image signal obtained at head 15, the ink layer of the ribbon 23 is selectively and thermally transferred onto the sheet P according to the image signal. When the sheet P has been thus transferred by the roller 28 and the ribbon 23 is wound on the reel 22 in this transferring operation, the document pattern is gradually formed on the sheet P. The sheet P thus printed with the document pattern is ejected via the rollers 30*a* and 30*b* into an ejected sheet tray 38. The original document is ejected into a document tray 39.

Figure 4:
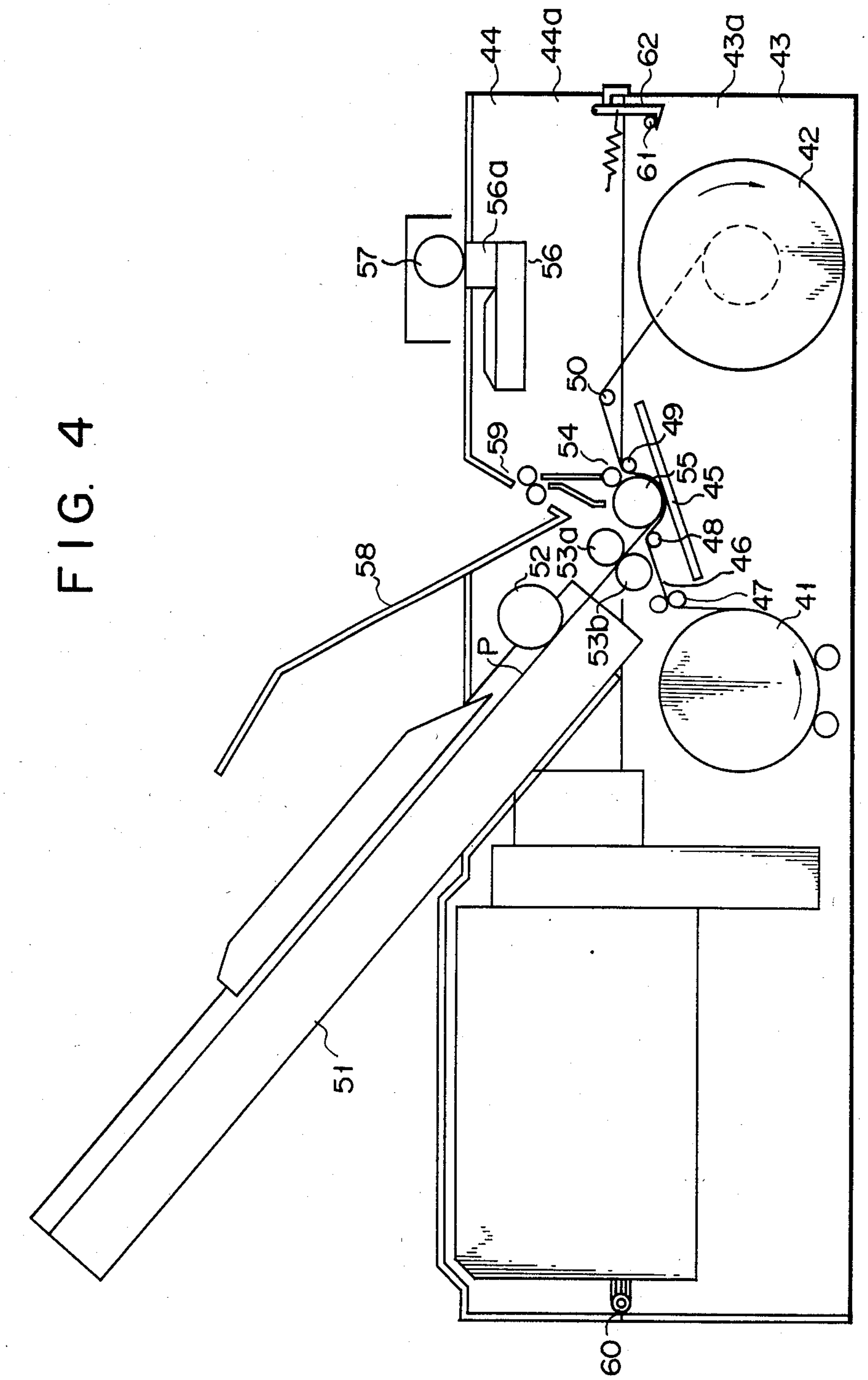
FIG. 4 is a side view of a thermal transfer type electroprinting apparatus according to another embodiment of the present invention.

In the embodiment described above, the ink ribbon feeding reel and the ink ribbon winding reel are provided in the upper unit. However, these reels may be provided in the lower unit. In other words, as shown in FIG. 4, an ink ribbon feeding reel 41 and an ink ribbon winding reel 42 are provided in a lower unit 43. Further, a thermal head unit 45 is provided in the bottom unit 43, and the ribbon 46 is extended between the reels 41 and 42 so as to feed across the unit 45 under the guidance of rollers 47, 48, 49 and 50.

A paper cassette 51 adapted to be obliquely mounted from above is provided at the unit 44. A paper feed roller 52 contacts the upper surface of the papers P of the cassette 51. Rollers 53*a* and 53*b* are provided to convey a paper sheet P, fed from the cassette 51 via the roller 52, to a printing section 54 which includes the thermal head unit 45. The sheet P and the ribbon 46 are pressed against the head 45 by a head roller 55. At this time, the ribbon 46 contacts the head of the unit 45, and the ink layer of the ribbon 46 is thermally transferred onto the sheet by the thermal head. A contact scanner 56 is provided at the upper front part of the unit 44. The document intimately contacts a sensor head 56*a* of the scanner 56 by a roller 57. Further, an ejected sheet tray 58 is provided at the unit 44, and the sheet P thus printed in the section 54 is ejected via a sheet ejecting roller 59 into the tray 58.

Figure 5:
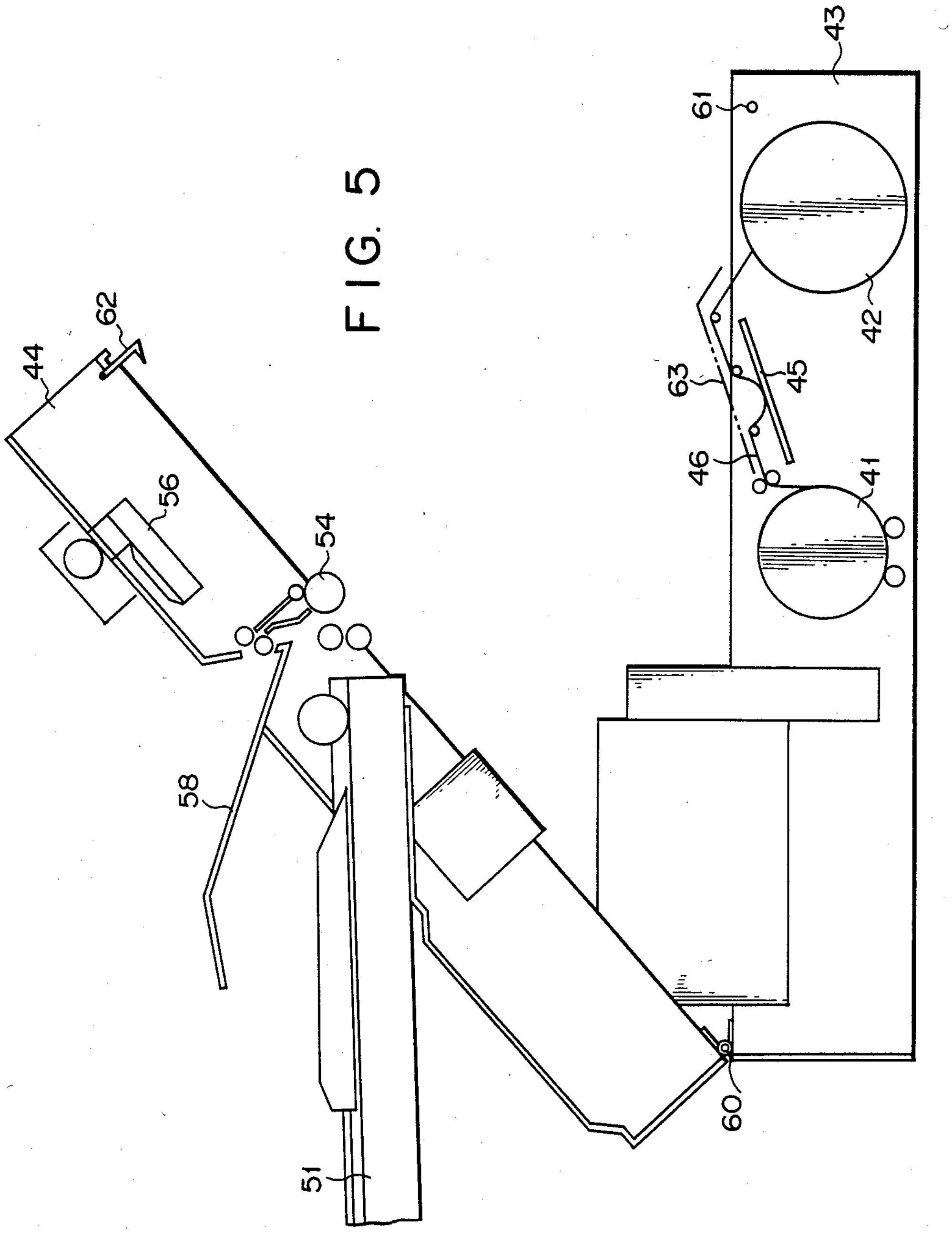
FIG. 5 is a side view of the apparatus in FIG. 4 when opened.

The units 43 and 44 are rotatably coupled via a hinge 60 provided at the rear. The units 43 and 44 are locked at the front side with a lock pin 61 fixedly secured to the frame 43*a* of the unit 43, and a hook 62 pivotally secured to the frame 44*a* of the unit 44. When the hook 62 is pulled forward, it is removed from the pin 61, and the lock of both the units 43 and 44 is released. When the unit 44 is raised in this state, the unit 44 is separated from the unit 43 as shown in FIG. 5. At this time, the roller 54 is separated from the ribbon 45, and the ink ribbon travelling path 63 of the ribbon 46 is exposed. When a paper jam occurs in the path 63, the path can be readily uncovered, and also the reels 41 and 42 can be readily exchanged.

In the embodiment described above, the reels 41 and 42 are provided in the bottom unit 43. Therefore, the reels 41 and 42 can be more readily exchanged as compared with the previous embodiment described above.

According to the present invention, as described above, there is provided the electroprinting apparatus which is constructed to separate the upper unit from the lower unit at the boundary of the ink ribbon travelling path. Therefore, the maintenance of the electroprinting apparatus in the ink ribbon travelling path can be readily performed, and the exchanging of the ink ribbon and the handling of the apparatus can be facilitated.

What we claim is:

1. A thermal transfer type electroprinting apparatus comprising:

scanning means for scanning a document to convert the pattern of the document to pattern information;

ink medium feeding means for mounting an ink medium provided with an ink material and for feeding said ink medium along an ink medium travelling path;

paper feeding means for feeding a paper sheet along said ink medium travelling path; and a printing section comprising thermal head means arranged along said ink medium travelling path and driven in accordance with said pattern information for selectively thermally transferring said ink material of said ink medium onto said paper sheet, said apparatus being separable into at least first and second units along said ink medium travelling path;

wherein said first unit is a lower unit comprising said paper feeding means and means for guiding said paper to said ink medium travelling path; and said second unit is an upper unit incorporating said scanning means, said ink medium feeding means and said thermal head means, said first and second units being hingedly separable along said ink medium travelling path.

2. The electroprinting apparatus according to claim 1, wherein said first and second units comprise upper and lower units openably arranged above and below said ink medium travelling path, said upper unit being fitted with said scanning means and said paper feeding means, and said lower unit being fitted with said thermal head means and said ink medium feeding means.

3. The electroprinting apparatus according to claim 2, further comprising hinge means for pivotally securing the rear end of said upper and lower units, and locking means for locking together the front ends of said upper and lower units.

4. The electroprinting apparatus according to claim 1, wherein said means containing an ink medium comprises: (1) first reel means for storing said ink medium, (2) means for guiding said ink medium of said first reel means to said ink medium travelling path, and (3) second reel means for winding said ink medium after being passed through said ink medium travelling path by said guiding means.

5. The electroprinting apparatus according to claim 1, wherein said print section further comprises roller means for pressing said paper sheet against said ink medium and said thermal head means, said roller means being separable from said ink medium travelling path.

6. A thermal transfer type electroprinting apparatus comprising:

means for outputting document information corresponding to a document pattern;

a first section including thermal head means driven according to said document information outputted from said document information outputting means for transferring ink from an ink ribbon having an ink material, to a paper sheet;

a second section including head roller means opposing said thermal head means for biasing said ink ribbon and said paper sheet against said thermal head means;

means for separating said first and second section;

means for feeding said ink ribbon between said thermal head means and said head roller means, said ink ribbon feeding means being disposed on said first section; and means for feeding said paper sheet into contact with said ink ribbon in the vicinity of said thermal head means, said ink ribbon being transferred by said thermal head means to said paper sheet according to said document information, thereby printing said document pattern on said paper sheet, said paper sheet feeding means being disposed on said second section.

7. The electroprinting apparatus according to claim 6, wherein said means for separating comprises means for upwardly rotating said first section from said second section.

8. The electroprinting apparatus according to claim 6, wherein said means for separating comprises means for upwardly rotating said second section from said first section.

9. The electroprinting apparatus according to claim 6, wherein said means for separating comprises hinge means for pivotally securing said first and second sections at one end.

10. The electroprinting apparatus according to claim 6, wherein said means for outputting document information is an optical scanner means for scanning a document to obtain said document information.

11. The electroprinting apparatus according to claim 6, wherein said means for feeding an ink ribbon comprises first reel means for containing said ink ribbon and second reel means for winding said ink ribbon after passing said thermal head means.

12. The electroprinting apparatus according to claim 6, wherein said second section is a lower unit comprising said head roller means and said means for feeding a paper sheet, and said first section is an upper unit openably disposed on said lower unit.

13. The electroprinting apparatus according to claim 12, further comprising hinge means for pivotally securing said first and said second units at one end.

14. The electroprinting apparatus according to claim 6, wherein said second section is a upper unit comprising said head roller means and said means for feeding a paper sheet, and said first section is an lower unit openably disposed on said upper unit.

15. A thermal printing type copying machine comprising:

document reading means for reading the pattern on an original document and converting said pattern to electrical signals characteristic of said document;

ink ribbon means for selectively darkening areas of a paper sheet when a portion of said ink ribbon means is heated, said ink ribbon means being mounted on rotating reels which convey said ink ribbon means along an ink medium travelling path;

thermal head means for selectively heating portions of said ink ribbon means in response to said signals, said thermal head means being located along said ink medium traveling path;

head roller means located along said ink medium travelling path for pressing said paper sheet and said ink ribbon means against said thermal head means;

said copying machine being divided in at least two parts, a first unit and a second unit, separable along a central axis which is generally parallel to the plane of the underlying supporting surface for said machine; wherein said first unit is an upper unit including said head roller means; and said second unit is a lower unit including said document reading means, said ink ribbon means and said thermal head means; said first and second units being hingedly separable along said ink medium travelling path.

16. A copying machine as in claim 15 further comprising hinge means for pivotally securing said at least two separable parts, and locking means for inhibiting unintentional separation of said at least two separable parts.

* * * * *